United States Patent
Yaung et al.

(10) Patent No.: US 6,470,353 B1
(45) Date of Patent: Oct. 22, 2002

(54) OBJECT-ORIENTED FRAMEWORK FOR MANAGING ACCESS CONTROL IN A MULTIMEDIA DATABASE

(75) Inventors: Alan Tsu-I Yaung, San Jose; Jy-Jine James Lin, Cupertino, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,946

(22) Filed: Sep. 17, 1999

(51) Int. Cl.$^7$ .............................................. G06F 17/30
(52) U.S. Cl. .................................... 707/103 R; 707/10
(58) Field of Search .............................. 707/10, 103 R, 707/200; 709/200, 228, 316; 713/201, 202, 200; 345/335

(56) References Cited

U.S. PATENT DOCUMENTS

| | | |
|---|---|---|
| 5,335,346 A | 8/1994 | Fabbio |
| 5,437,027 A | 7/1995 | Bannon et al. |
| 5,471,619 A | 11/1995 | Messina |
| 5,524,238 A | 6/1996 | Miller et al. |
| 5,649,185 A | 7/1997 | Antognini |
| 5,664,189 A | 9/1997 | Wilcox et al. |
| 5,675,782 A | 10/1997 | Montague et al. |
| 5,680,452 A | 10/1997 | Shanton |
| 5,752,244 A | 5/1998 | Rose et al. |
| 5,752,247 A | 5/1998 | Henderson |
| 5,787,413 A | 7/1998 | Kauffman et al. |
| 5,787,427 A | 7/1998 | Benantar et al. |
| 5,870,080 A | 2/1999 | Burnett et al. |
| 6,035,399 A * | 3/2000 | Klemba et al. ............. 713/200 |
| 6,104,392 A * | 8/2000 | Shaw et al. ................. 345/335 |
| 6,289,382 B1 | 9/2001 | Bowman-Amuah |
| 6,289,462 B1 | 9/2001 | McNabb et al. |

FOREIGN PATENT DOCUMENTS

| | | |
|---|---|---|
| EP | 881577 A | 5/1998 |
| EP | 886212 | 6/1998 |
| JP | 10198593 | 7/1998 |
| WO | 9919797 A | 9/1998 |

OTHER PUBLICATIONS

IBM Technical Disclosure Bulletin, "Distributing SOMObjects Using Distributed Computed Environment", vol. 39 No. 11, Nov. 1996, pp. 195–196.

IBM Technical Disclosure Bulletin, "Reuseable Object Oriented Framework For Plug Compatible Applications", vol. 38 No. 3, Mar. 1995, pp. 567–573.

Sung JS and Hwang, DJ; "Real–Time Multimedia Collaboration Environment And Real–Time Distance Learning System"; Proceedings of the IASTED/ISMM International Conference Modelling and Simulation, pp. 173–176, Published: Anaheim, CA, USA, 1996.

Eckardt TO et al; "Beyond In And UPT–A Personal Communications Support System Based On TMN Concepts", IEEE Journal on Selected Areas in Communications, vol. 15, No. 7, pp. 1308–1314, Sep. 1997.

Demurjian, SA et al.; "User–Role Based Security For Collaborative Computing Environments", Multimedia Review, vol. 4, No. 2, pp. 40–47, Summer 1993.

Bong Joon Choi, et al.; "Multi–User Game On T. 120 Based Replicated Shared Object Protocol Entity", The 6th IEEE Singapore International Conference on Network'98, pp. 407–410, Published: Singapore, 1998.

* cited by examiner

Primary Examiner—Diane D. Mizrahi (57) ABSTRACT

A method, apparatus, and article of manufacture for an object-oriented framework for managing access control in a multimedia database connected to a computer is provided. A datastore access control object is generated for the datastore, wherein the datastore access control object enables controlling access to the datastore. An access control list object is manipulated with the datastore access control object to set access privileges.

39 Claims, 4 Drawing Sheets

OBJECT-ORIENTED FRAMEWORK FOR MANAGING ACCESS CONTROL IN A MULTIMEDIA DATABASE

CROSS-REFERENCE TO RELATED APPLICATION

This application is related to the following co-pending and commonly-assigned patent application Ser. No. 09/398,374, entitled, "Access Control System for a Multimedia Datastore" filed on the same date herewith, by Alan T. Yaung, et al., which is incorporated by referenced herein.

BACKGROUND OF THE INVENTION

1. Field of the Invention

This invention relates in general to computer-implemented database management systems, and, in particular, to an object-oriented framework for managing access control to a multimedia database.

2. Description of Related Art

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

In a digital library (DL), the multimedia object can be linked with the associated indexing information, since both are available in digital form. Integration of this legacy catalog information with the digitized object is crucial and is one of the great advantages of digital library technology. Different types of objects can be categorized differently as appropriate for each object type. Existing standards like MARC records for libraries, Finding Aids for archiving of special collections, etc. can be used when appropriate.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Controlling access to digital libraries and other types of multimedia databases by multiple users is an important aspect of managing the distribution of contents in a multimedia database. Currently, access control support has been problematic and of limited capability. An example of one such access control support is the access control provided for the DB2 Digital Library, a product from International Business Machines Corporation of Armonk, N.Y. The DB2 Digital Library provides two ways in which the user can provide access control. First, the DB2 Digital Library product includes a ready-to-use Java system administration tool. However, this Java system administration tool has a limited number of functions and is thus unacceptable for many sophisticated users. The DB2 Digital Library product also provides a low-level set of C Application Programming Interfaces (APIs) from which users can develop customized access control. However, these low-level APIs have three deficiencies. First, they are difficult to use for novice users. Second, they provide only limited functionalities and cannot meet the expectation of today's demanding application programers. Finally, these low level C APIs have no corresponding higher level APIs to allow for better interoperability.

Accordingly, there is a need in the art for an object-oriented framework for managing access control in a multimedia database which provides better usability, an expanded and more sophisticated capability, and increased interoperability.

SUMMARY OF THE INVENTION

To overcome the limitations in the prior art described above, and to overcome other limitations that will become apparent upon reading and understanding the present specification, the present invention discloses a method, apparatus, and article of manufacture for an object-oriented framework for managing access control in a multimedia database.

In accordance with the present invention, a technique for controlling access to a datastore connected to a computer is provided. Initially, a datastore access control object is generated for the datastore. The datastore access control object enables controlling access to the datastore by manipulating an access control list object to set access privileges.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
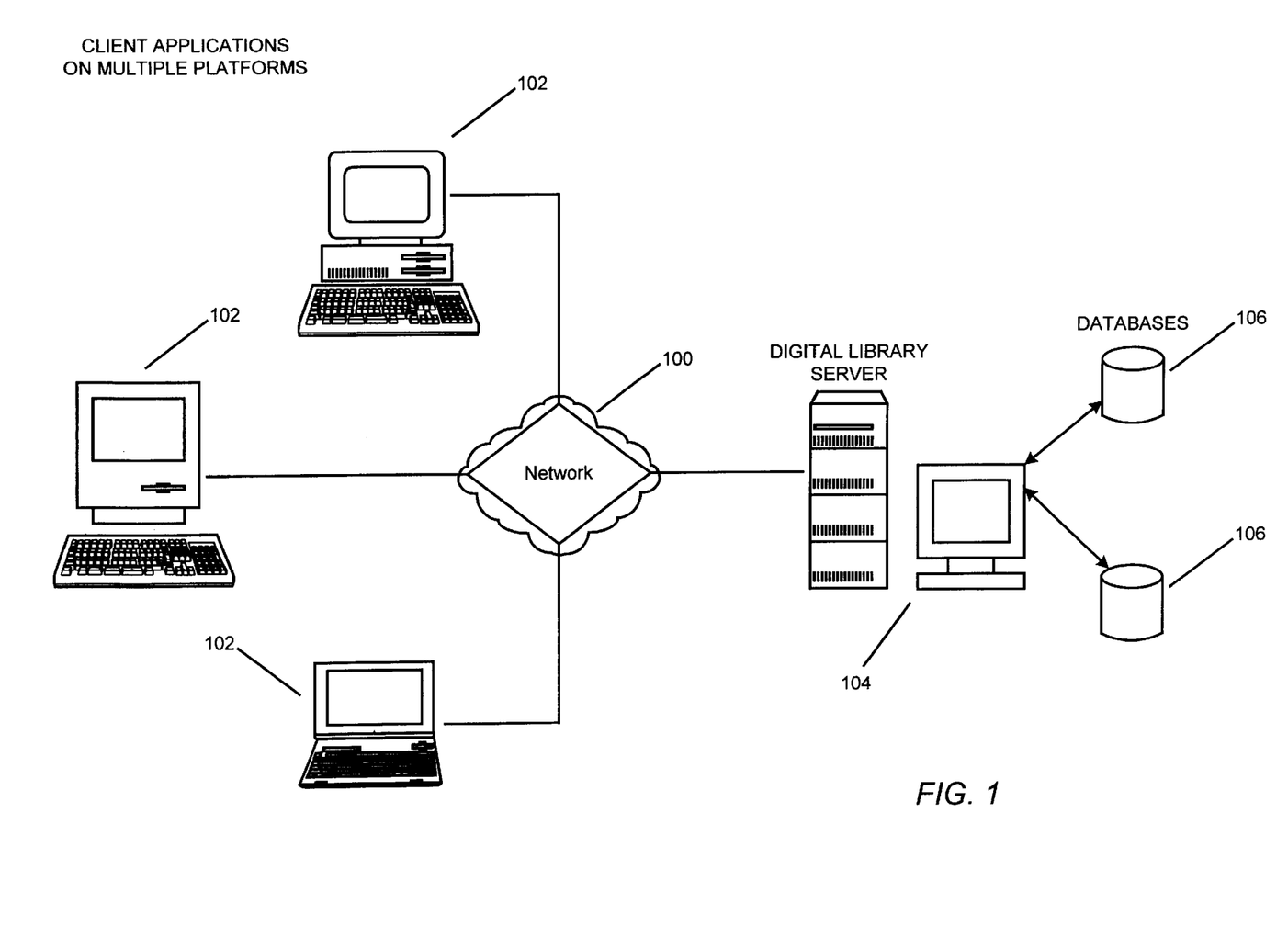
FIG. 1 schematically illustrates the hardware environment of a preferred embodiment of the present invention, and more particularly, illustrates a typical distributed computer system.

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.
Hardware Environment FIG. 1 schematically illustrates the hardware environment of a preferred embodiment of the present invention, and more particularly, illustrates a typical distributed computer system using the network 100 to connect client computers 102 executing client applications to a Digital Library server computer 104 executing software and other computer programs, and to connect the server system 104 to data sources 106. A data source 106 may comprise, for example, a multi-media database. A typical combination of resources may include client computers 102 that are personal computers or workstations, and a Digital Library server computer 104 that is a personal computer, workstation, minicomputer, or mainframe. These systems are coupled to one another by various networks, including LANs, WANs, SNA networks, and the Internet.

A client computer 102 typically executes a client application and is coupled to a Digital Library server computer 104 executing server software. The client application is typically a software program such as a workflow application. The server software is typically a program such as IBM's Digital Library server software. The Digital Library server computer 104 also uses a data source interface and, possibly, other computer programs, for connecting to the data sources 106. The client computer 102 is bi-directionally coupled with the Digital Library server computer 104 over a line or via a wireless system. In turn, the Digital Library server computer 104 is bi-directionally coupled with data sources 106.

The data source interface may be connected to a Database Management System (DBMS), which supports access to a data source 106 by executing RDBMS software. The interface and DBMS may be located on the same server as the Digital Library server computer 104 or may be located on a separate machine. The data sources 106 may be geographically distributed.

Figure 2:
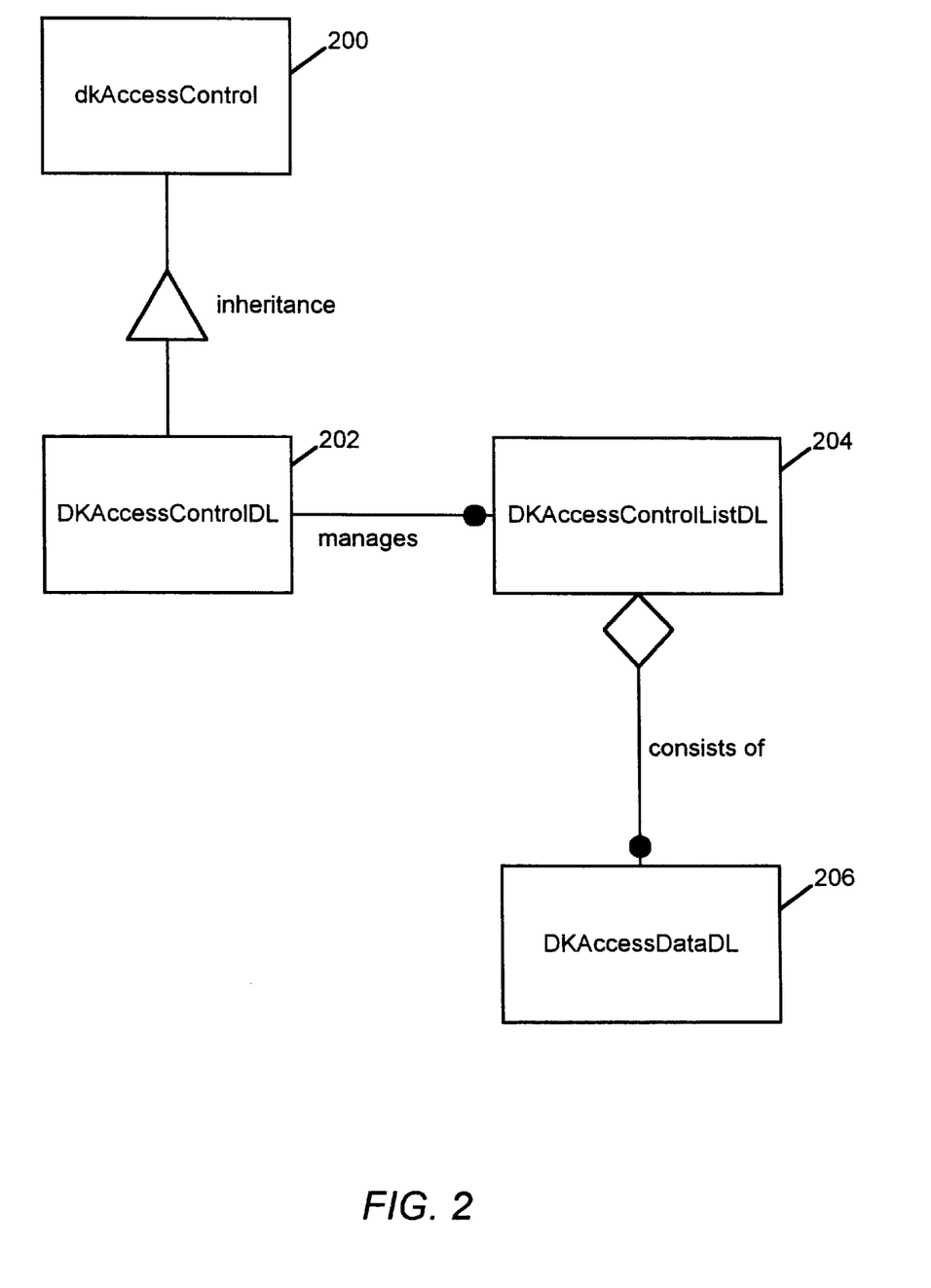
FIG. 2 schematically illustrates an object-oriented framework for managing access control and the class and objects of the present invention.

Those skilled in the art will recognize many modifications may be made to this configuration without departing from the scope of the present invention.
An Object-Oriented Framework for Managing Access Control in a Multimedia Database An embodiment of the present invention provides an object-oriented framework for managing access control in a multimedia database and is illustrated in FIG. 2. As one skilled in the art will recognize, this object-oriented framework is portrayed using the Object Modeling Technique (OMT) Notations developed by James Rumbaugh. The sample class structure and objects provided below are in the C++ programming language, but one skilled in the art will recognize that the object-oriented framework presented in FIG. 2 can be represented in C++, Java, ActiveX or another programming language with suitable object-oriented programming capabilities.

With reference to FIG. 2, an access control class 200 is an abstract class of access control, and is termed the dkAccessControl class in the sample class below. Access control class 200 defines the base class for access control and provides a set of common methods for different access control mechanisms which are provided for controlling access to the respective datastores. A datastore access control class 202 is based on the access control class 200, and inherits the properties of the access control class 200. In the example below the datastore access control class 202 is termed DKAccessControlDL and represents an access control class for a Digital Library datastore. It will be understood that one or more datastore access control objects can be instantiated from the datastore access control class 202, with each instantiated object inheriting the properties of the access control class 200 and controlling access to a different Digital Library datastore.

It will be further understood that other datastore access classes may be defined, such as DKAccessControlV4 for a VisualInfo 400 datastore. The access control class 202 includes multiple methods for the manipulation of an access control list. For example, a datastore access control object of the datastore access control class 202 can add a new access control list by specifying a name or other identifier for that list and then providing the textual information to be inserted into the new access control list. The datastore access control object can then manipulate that access control list by, for example, updating it with new information such as adding a new user, granting a current user additional access privileges or deleting a user from an access control list.

In a preferred embodiment, the datastore access control object manages one or more objects based on an access control list class 204. In other words, each access control list is itself an object. In the example provided below, this access control list class is termed DKAccessControlListDL. The access control list class includes multiple methods for the manipulation of the list. For example, an access control list object of the access control list class can set a name of a new access control list, set a description of the new list, and then update the list when new information is provided to it. Also in the preferred embodiment, the access control list object consists of one or more access data objects based on an access data class 206. Each access data object corresponds to a row of access data in the access control list.

The following is a sample class structure for an access control class 200:

```
class dkAccessControl
{
    public:
        dkAccessControl (const char * access_control_type,
                const char * access_control_name = " ");
        virtual ~dkAccessControl ( );
        virtual void setDatastore(dkDatastore ds);
        virtual dkDatastore * getDatastore( );
        virtual DKString type ( ) const;
        virtual DKString getName ( ) const;
        virtual void setName (const char * access_control_name);
        virtual void addAccessControlList (const char * acl_name,
                        const char * description,
                        dkCollection * access_data);
        virtual void updateAccessControlList (const char * acl_name,
                        const char * description,
                        dkCollection * access_data);
        virtual void deleteAccessControlList (const char * acl_name);
        virtual dkCollection * listAccessControlLists ( );
        virtual dkCollection * listPrivileges ( );
        virtual dkCollection * listUsers ( );
        virtual dkCollection * listGroups ( );
        virtual DKString listPrivilegeString (const char *
    privilege_name) ;
};
```

This sample class provides for class Constructors and Destructors in the form of:

dkAccessControl(const char * access_contro_type
const char * access_control_name="");
virtual~kAccessControl( );

The dkAccessControl constructor has two parameters: (1) access_control_type indicates the type of access control; and (2) access_control_name identifies the name of access control.

The access control class includes the following methods to manipulate an object of the access control class:
setDatastore
virtual void setDatastore(dkDatastore ds);
Sets the datastore.
getDatastore
virtual dkDatastore * getDatastore( );
Returns the datastore.
type
virtual DKString type( ) const;
Returns the type of access control.
getName
virtual DKString getName( ) const;
Returns the name of access control.
setName
virtual void setName(const char * access_control_name);
Sets the name of access control.
addAccessControlList
virtual void addAccessControlList(const char * acl_name,
const char * description,
dkCollection * access_data);

Adds an access control list with a name, a description, and access data.
updateAccessControlList
virtual void updateAccessControlList (const char * acl_name,
const char * description);
Updates an access control list with a name, a description, and access data.
deleteAccessControlList
virtual void deleteAccessControlList(const char * acl_name);
Deletes the access control list specified by the user.
listAccessControlLists
virtual dkCollection * listAccessControlLists( );
Lists all the access control lists in the system.
list Privileges
virtual dkCollection * listprivileges( );
Lists all the privileges in the system.
listUsers
virtual dkCollection * listUsers( );
Lists all the users in the system.
listGroups
virtual dkCollection * listgroups( );
Lists all the groups in the system.
listPrivilegeString
virtual DKString listPrivilegeString(const char * privilege_name)
Lists the privilege string of the specified privilege name.

A datastore access control object is an instance of the DKAccessControlDL class 202, which is derived from its base class dkAccessControl. This DKAccessControlDL class is the concrete implementation of the abstract base class dkAccessControl for access control provided in the digital library.

The following is a sample class structure for a datastore access control class 202:

```
class DKAccessControlDL : public dkAccessControl
{
    public:
        DKAcessControlDL (DKDatastoreDL * ds);
        ~DKAccessControlDL ( );
        void addAccessControlList (const char * acl_name,
                        const char * description,
                        dkCollection * access_data);
        void updateAccessControlList (const char * acl_name,
                        const char * description,
                        dkCollection * access_data);
        void deleteAccessControlList (const char & acl_name);
        dkCollection * listAccessControlLists ( );
        DKAccessControlListDL * listAccessControlList (vonst char *
    acl_name);
        DKString getItemACL (const char * itemID);
        void setItemACL (const char * itemID,
                        const char * acl_name);
        dkCollection & listPrivileges ( );
        dkCollection * listUsers ( );
        dkCollection * listUsers (const char * group_name);
        dkCollection * listGroups ( );
        dkCollection * listGroups (const char * user_name);
        DKString listPrivilegeString (Const char * privilege_name);
        DKBoolean isAuthorized (const char * privilege_string,
                        long authority);
        DKBoolean isAccessControlList (const char * privilege_name);
        DKBoolean is Privilege (const char * privilege_name);
        DKBoolean isUser (const char * user_name);
        DKBoolean isGroup (const char * group_name);
};
```

This sample class provides for class Constructors and Destructors in the form of:

DKAccessControlKL(DKDatastoreDL * ds);
    ~DKAccessControlDL( );

The DKAccessControlDL constructor has a parameter that is a pointer to a Digital Library datastore for requesting access control functions.

The datastore access control object includes the following methods to manipulate an object of the access control list class:

addAccessControlList void addAccessControlList(const char * acl_name,
        const char * description,
        dkCollection * access_data);

Adds an access control list into the system. The parameter acl_name specifies the name of access control list. The parameter description provides the textual information of the access control list. The parameter access_data specifies the access data entries of the access control list. Each access_data entry is an object of DKAccessDataDL, which is defined below.

updateAccessControlList void updateAccessControlList(const char * acl_name,
        const char * description,
        dkCollection * access_data);

Updates an access control list in the system. The parameter acl_name specifies the name of access control list. The parameter description provides the textual information of the access control list. The parameter access_data specifies the access data entries of the access control list. Each access data entry is an object of the access data class, identified as DKAccessDataDL, which is defined below.

deleteAccessControlList void deleteAccessControlList(const char *acl_name);

Deletes an access control list in the system. The parameter acl_name specifies the name of access control list.

listAccessControllists dkCollection * listAccessControlLists( );

Returns a collection of DKAccessControlListDL objects defined in the system.

listAccessControlList

DKAccessControlList * listAccessControlList(const char * acl_name);

Returns a DKAccessControlListDL object with the specified name.

getItemACL

DKString getItemACL(const char * itemID);

Returns the name of access control list of the specified item ID.

SetItem ACL void setitemACL(const char * itemID, const char * acl_name);

Associates an access control list with the specified item ID.

listPrivileges dkCollection * listprivileges( );

Returns a collection of DKString objects containing the name of privilege sets defined in the system.

listPrivilege

DKString listPrivilege(const char * user_name);

Returns the privilege name of the specified user.

listUsers dkCollection * listUsers( );

Returns a collection of DKString objects containing the name of users defined in the system.

listUsers with 1 parameter dkCollection * listUsers(const char * group_name);

Returns a collection of DKString objects containing the name of users defined in a group.

listGroups dkCollection * listGroups( );

Returns a collection of DKString objects containing the name of groups defined in the system.

listGroups with 1 parameter dkCollection * listgroups(const char * user_name);

Returns a collection of DKString objects containing the name of groups that the specified user is member of.

listPrivilegeString

DKString listPrivilegeString(const char * privilege_name);

Returns the privilege string of the specified privilege name.

isAuthorized

DKBoolean isAuthorized(const char * privilege_string,
        long authority);

Returns a value of TRUE if the specified authority is granted in the privilege string, otherwise returns a value of FALSE.

isAccessControlList

DKBoolean isAccessControlList(const char * acl_name);

Returns a value of TRUE if the specified name is a valid access control list, otherwise it returns a value of FALSE.

isPrivilege

DKBoolean isprivilege(const char * privilege_name);

Returns a value of TRUE if the specified name is a valid privilege, otherwise it returns a value of FALSE.

isUser

DKBoolean isUser(const char * user_name);

Returns a value of TRUE if the specified name is a valid user, otherwise it returns a value of FALSE.

isGroup

DKBoolean isgroup(const char*group_name);

Returns a value of TRUE if the specified name is a valid group, otherwise it returns a value of FALSE.

An access control list class 204 is represented by the sample class termed DKAccessControlListDL which is an object-oriented representation of an access control list in a digital library. It provides get/set methods and add/update/delete/retrieve methods.

The following is a sample class structure for an access control list class 204:

```
class DKAccessControlListDL
{
    public:
        DKAccessControlListDL (DKAccessControlDL * ac,
                        const char * name)
        DKAccessControlListDL (DKAccessControlDL * ac);
        ~DKAccessControlListDL ( );
        void setName (const char * name);
        void setDescription (const char * description);
        void setAccessData (dkCollection * access_data);
        DKString getName ( );
        void add ( );
        void update ( );
        void del ( );
};
```

This sample class provides for class Constructors and Destructors in the form of:

DKAccessControlListDL(const char * name);

DKAccessControlListDL( );

DKAccessControlListDL( );

The first constructor with one parameter is used to retrieve an existing access control list in the memory. The second constructor without a parameter is used to create a new access control list in the memory.

The access control list object includes the following methods to manipulate an object of the access data class:
setName void setName(const char * name);

Sets the name of the access control list.
setDescription void setdescription(const char * description);

Sets the description of the access control list.
setAccessData void setAccessData(dkCollection * access_data);

Sets the access data for the access control list. access_data is a collection of DKAccessDataDL objects.
getName DKString getName( );

Returns the name of the access control list.
get Description

DKString getDescription( );

Returns the description of the access control list.
getAccessData dkCollection * getAccessData( );

Returns a collection of DKAccessDataDL objects containing the access data of the access control list.
retrieve void retrieve( );

Retrieves the access control list from the persistent storage to main memory. add void add( );

Adds the access control list into the persistent storage.
update void update( );

Updates the access control list in the persistent storage.
del void del( );

Deletes the access control list from the persistent storage.

An access data class 206, is represented by the sample class DKAccessDataDL class which is an object-oriented representation of an access data associating with an access control list. It provides get/set methods. This class defines the entries in an access control list.

The following is a sample class structure for an access data object 206:

```
class DKAccessDataDL
{
    public:
        DKAccessDataDL (long command,
                long patron_type,
                const char * patron,
                const char * privilege_name);
        DKAccessDataDL ( );
        ~DKAccessDataDL ( );
        long getCommand ( );
        long getPatronType ( );
        DKString getPatron ( );
```

-continued

```
        DKString getPrivilegeName ( );
        void setCommand (long command);
        void setPatronType (long patron_type);
        void setPatron (const char * patron);
        void setPrivilegeName (const char * privilege_name);
};
```

This sample class provides for class Constructors and Destructors in the form of:

DKAccessDataDL (long command,
    long patron_type.
    const char * patron,
    const char * privilege_name);

DKAccessDataDL( );

~DKAccessDataDL( );

The first DKAccessDataDL constructor has four parameters:

command indicates the command for this object.

patron_type indicates the type of a user.

patron specifies the name of a user.

privilege_name indicates the textual name of a privilege set.

The command parameter sets the command of this access data. A valid command can be one of the following:

DK_ACTION_ADD—add the access data in the access control list

DK_ACTION_UPDATE—update the access data in the access control list

DK_ACTION_DELETE—delete the access data from the access control list

A valid patron type can be one of the following:

DK_PATRON_TYPE_GROUP—group access

DK_PATRON_TYPE_OWNER—owner access

DK_PATRON_TYPE_PUBLIC—public access

DK_PATRON_TYPE_USER—user access

The second constructor without parameters is used to create an empty DKAccessDataDL.

The access data class includes the following methods to manipulate an object of the access data class:
getcommand long getcommand( );

Returns the command of this access data.
getPatronType long getPatronType( );

Returns the type of the patron.
getPatron

DKString getpatron( );

Returns the user ID of the patron.
getPrivilegeName

DKString getPrivilegeName( );

Returns the name of the privilege set.
setCommand void setcommand(long command);

Sets the command of this access data. The valid commands are described above.
setPatron Type void setPatron Type(long patron_type);

Sets the type of the patron. The valid patron types are described above.

setPatron
    void setpatron(const char * patron);
Sets the user ID of the patron.
setPrivilegeName
    void setPrivilegeName(const char * privilege_name);
Sets the name of the privilege set.

Figure 3:
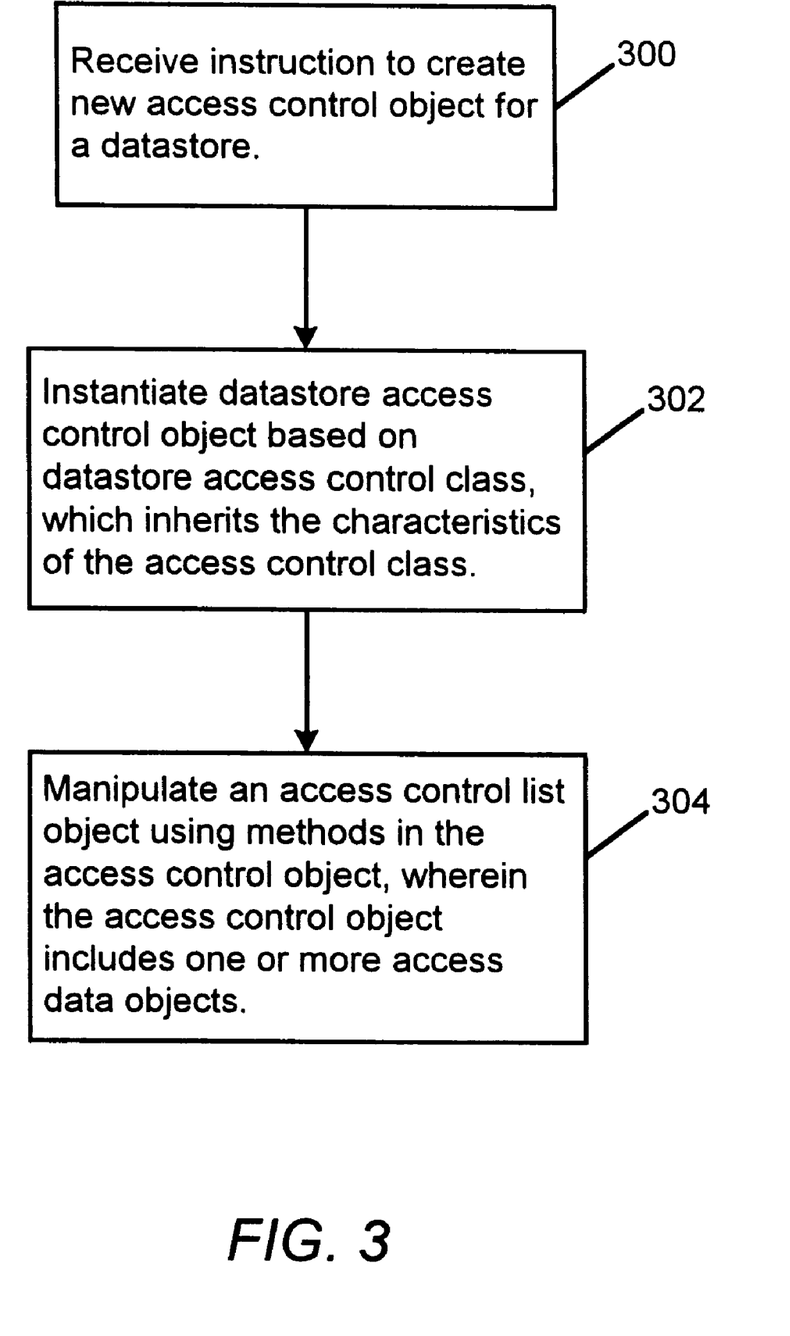
FIG. 3 is a flow chart illustrating the order of operation of the method of the present invention.

FIG. 3 is a flow diagram that illustrates the use of the object oriented framework. As shown in FIG. 3, block 300, a computer receives an instruction from a user to instantiate a datastore access control object. The computer then instantiates the object, which inherits all of the characteristics of the access control class from which it is derived, as is shown in block 302. (See also FIG. 2) Next, the user could use the datastore access control object to manipulate an access control list object using the methods provided in the datastore access control object as shown in block 304. For example, the user could update the access control list object using the update method explained above.

Figure 4:
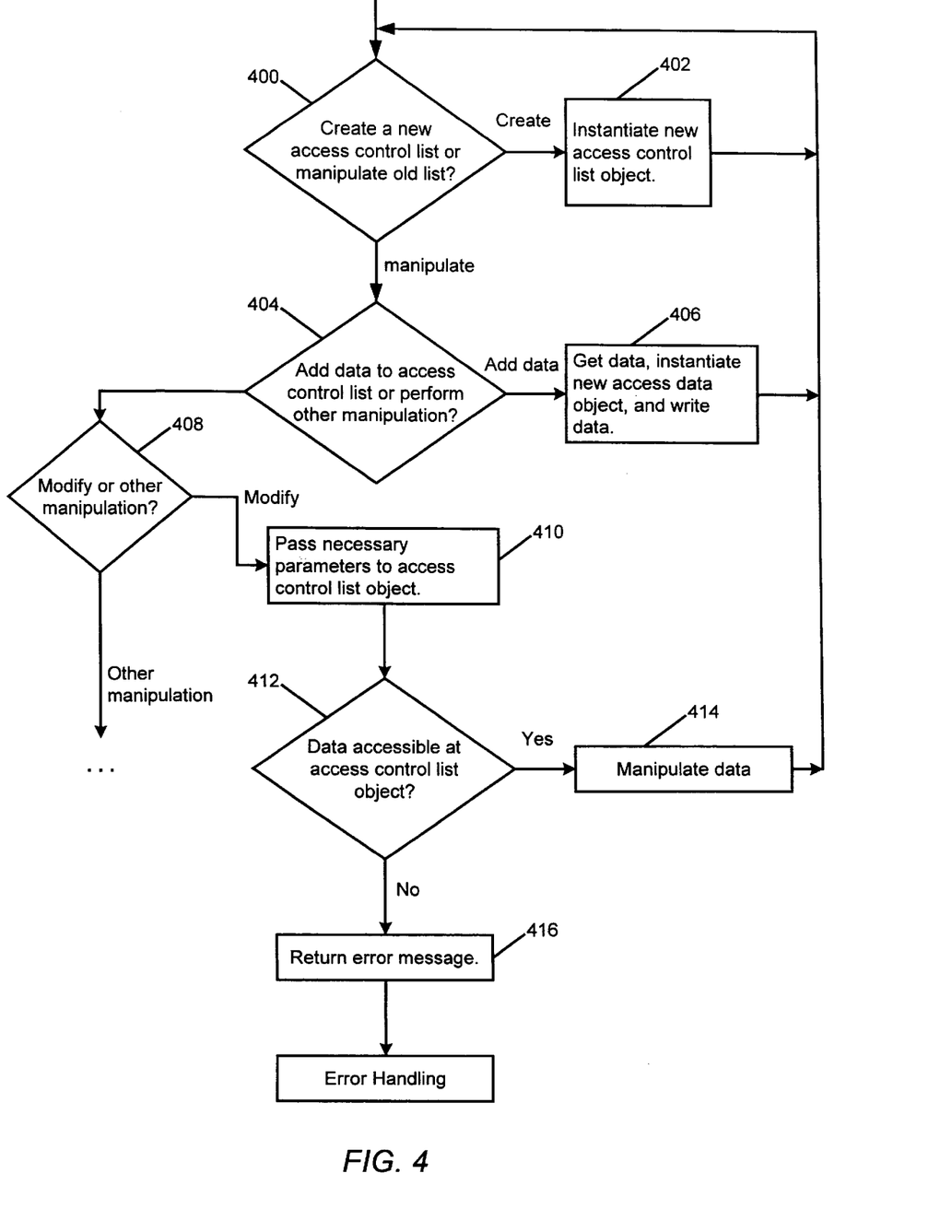
FIG. 4 is a flow chart illustrating some of the operations that may be performed with a datastore access control object of the present invention.

A more detailed illustration of some of the processes that may be performed in block 304 is provided in FIG. 4, which is a flow diagram illustrating some operations that may be performed by a datastore access control object of the present invention. First, as shown in block 400, the computer determines if the user is seeking to create a new access control list to be manipulated by the datastore access control object, or whether the user is seeking to manipulate an old list. If the user is going to create a new access control list, the computer will instantiate a new access control list object, as shown in block 402. After performing this function the computer will return to block 400 to await further instructions.

If the user will be adding new data, or otherwise manipulating a current access control list the computer moves to block 404. In block 404, the computer determines whether the user wants to add data to an access control list or perform some other manipulation.

If the user is adding data the computer carries out the functions of block 406 by instantiating a new access data object and writing the provided data into the object. This new access data object is, in essence, a new row in the access control list and it therefore comprises a part of the access control list object. In other words, the access control list object is composed of one or more access data objects. After performing this function, the computer awaits new instructions and returns to block 400.

If at block 404 the user chooses to perform some function other than adding data, the computer determines whether that function will be a modification or some other manipulation. If the instruction is to modify the access control list, control flows to block 410. If the user seeks to perform some other modification, that processing is done. The ellipse indicates that further processing takes place.

In block 410, the computer passes the necessary parameters to the proper access control list object. Next, in block 412, the computer determines whether the function can be fully performed and if the requested data is accessible at the access control list object level. If it can be, the access control list object is manipulated 414. The computer may then perform other processing, or return to block 400 to respond to a new user instruction. If the instruction cannot be fully processed, the access control list object returns an error message to the user as shown in block 416. If an error is detected, the computer may then perform user specified error handling.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Additionally it will be understood that the object-oriented framework for providing access control can be used to provide access control to various types of multimedia datastores, and is not limited to a digital library. It will also be understood that the functions and methods described in the sample classes above can be varied and modified as necessary without departing from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of controlling access to a datastore connected to a computer, the method comprising the steps of:
    generating a datastore access control object for the datastore, wherein the datastore access control object enables controlling access to the datastore; and
    manipulating an access control list object with the datastore access control object to set access privileges.

2. The method of claim 1, wherein the datastore access control object is based on a datastore access control class.

3. The method of claim 2, wherein the datastore access control class inherits characteristics of an access control class.

4. The method of claim 1, wherein the access control list object is based on an access control list class.

5. The method of claim 1, wherein the access control list object is comprised of one or more access data objects.

6. The method of claim 5, wherein the access data object is based on an access data class.

7. The method of claim 5 wherein the access data objects comprise a row of data defining one or more users and access privileges granted to the users.

8. The method of claim 1, wherein multiple datastores are connected to the computer and further comprising the step of generating a datastore access control object for each datastore.

9. The method of claim 1, wherein the datastore is a multimedia database.

10. The method of claim 1, wherein the datastore access control object manipulates the access control list object with methods to enable a user to perform functions selected from the group consisting of adding an access control list, updating an access control list, deleting an access control list, listing all access control lists, getting a specific access control list, listing the privileges specified in an access control list, listing users defined in an access control list, listing groups of users defined in an access control list, and determining whether a specific privilege has been granted to a specific user.

11. An apparatus for controlling access to a datastore, comprising:
    a computer having the datastore connected thereto;
    one or more computer programs, performed by the computer, for generating a datastore access control object for the datastore, wherein the datastore access control object enables controlling access to the datastore, and for manipulating an access control list object with the datastore access control object to set access privileges.

12. The apparatus of claim 11, wherein the datastore access control object is based on a datastore access control class.

13. The apparatus of claim 12, wherein the datastore access control class inherits characteristics of an access control class.

14. The apparatus of claim 11, wherein the access control list object is based on an access control list class.

15. The apparatus of claim 11, wherein the access control list object is comprised of one or more access data objects.

16. The apparatus of claim 15, wherein the access data object is based on an access data class.

17. The apparatus of claim 15 wherein the access data objects comprise a row of data defining one or more users and access privileges granted to the users.

18. The apparatus of claim 11, wherein multiple datastores are connected to the computer and further comprising the step of generating a datastore access control object for each datastore.

19. The apparatus of claim 11, wherein the datastore is a multimedia database.

20. The apparatus of claim 11, wherein the datastore access control object manipulates the access control list object with methods to enable a user to perform functions selected from the group consisting of adding an access control list, updating an access control list, deleting an access control list, listing all access control lists, getting a specific access control list, listing the privileges specified in an access control list, listing users defined in an access control list, listing groups of users defined in an access control list, and determining whether a specific privilege has been granted to a specific user.

21. An article of manufacture comprising a computer program carrier readable by a computer and embodying one or more instructions executable by the computer to perform method steps for controlling access to a datastore connected to a computer, the method comprising the steps of:

generating a datastore access control object for the datastore, wherein the datastore access control object enables controlling access to the datastore; and manipulating an access control list object with the datastore access control object to set access privileges.

22. The article of manufacture of claim 21, wherein the datastore access control object is based on a datastore access control class.

23. The article of manufacture of claim 22, wherein the datastore access control class inherits characteristics of an access control class.

24. The article of manufacture of claim 21, wherein the access control list object is based on an access control list class.

25. The article of manufacture of claim 21, wherein the access control list object is comprised of one or more access data objects.

26. The article of manufacture of claim 25, wherein the access data object is based on an access data class.

27. The article of manufacture of claim 25 wherein the access data objects comprise a row of data defining one or more users and access privileges granted to the users.

28. The article of manufacture of claim 25, wherein multiple datastores are connected to the computer and further comprising the step of generating a datastore access control object for each datastore.

29. The article of manufacture of claim 21, wherein the datastore is a multimedia database.

30. The article of manufacture of claim 21, wherein the datastore access control object manipulates the access control list object with methods to enable a user to perform functions selected from the group consisting of adding an access control list, updating an access control list, deleting an access control list, listing all access control lists, getting a specific access control list, listing the privileges specified in an access control list, listing users defined in an access control list, listing groups of users defined in an access control list, and determining whether a specific privilege has been granted to a specific user.

31. The method of claim 1, wherein the access privileges set by said datastore access control object are privileges for accessing an item in a digital library.

32. The method of claim 1, wherein the datastore access control object includes a method for returning a name of an access control list of an item in a digital library.

33. The method of claim 1, wherein the datastore access control object includes a method of associating an access control list with an item in a digital library.

34. The apparatus of claim 11, wherein the access privileges set by said datastore access control object are privileges for accessing an item in a digital library.

35. The apparatus of claim 11, wherein the datastore access control object includes a mechanism for returning a name of an access control list of an item in a digital library.

36. The apparatus of claim 11, wherein the datastore access control object includes a mechanism for associating an access control list with an item in a digital library.

37. The article of manufacture of claim 21, wherein the access privileges set by said datastore access control object are privileges for accessing an item in a digital library.

38. The article of manufacture of claim 21, wherein the datastore access control object includes a method for returning a name of an access control list of an item in a digital library.

39. The article of manufacture of claim 21, wherein the datastore access control object includes a method of associating an access control list with an item in a digital library.

* * * * *